United States Patent [19]

Zulli

[11] 4,082,828

[45] Apr. 4, 1978

[54] METHOD FOR PRODUCING THIN PARTICLE BOARD

[76] Inventor: Bruno Zulli, Via Mercatovecchio 19, 33100 Udine, Italy

[21] Appl. No.: 664,476

[22] Filed: Mar. 8, 1976

Related U.S. Application Data

[63] Continuation of Ser. No. 477,341, Jun. 7, 1974, abandoned.

[30] Foreign Application Priority Data

Jun. 7, 1973 Italy ............................. 83386 A/73
Jun. 7, 1973 Italy ............................. 83387 A/73

[51] Int. Cl.² ............................................. B29J 5/00
[52] U.S. Cl. .................................. 264/119; 264/109; 264/297; 264/DIG. 65; 425/DIG. 201
[58] Field of Search ....... 264/109, 122, 119, DIG. 65, 264/297; 424/DIG. 201, 223, 317, 338

[56] References Cited

U.S. PATENT DOCUMENTS

| | | | |
|---|---|---|---|
| 3,032,820 | 5/1962 | Johnson | 264/120 |
| 3,268,642 | 8/1966 | Hutter | 264/120 |
| 3,542,629 | 11/1970 | Burkner | 246/109 |

*Primary Examiner*—Robert F. White
*Assistant Examiner*—James R. Hall
*Attorney, Agent, or Firm*—Browdy and Neimark

[57] ABSTRACT

A particle board manufacturing method capable of manufacturing particle board of a thickness of 1 to 10 millimeters of fine or coarse chips, which includes a filling machine and a press wherein the press comprises a heatable platform for conveying the chip-resin mat from a filling machine to a press in a simple and efficient manner and without causing any distortion of the mat.

4 Claims, 15 Drawing Figures

METHOD FOR PRODUCING THIN PARTICLE BOARD

This is a continuation, of application Ser. No. 477,341, filed June 7, 1974, now abandoned.

FIELD OF THE INVENTION

The invention relates to a method for the production of boards and more particularly to the process for making particule boards of fine thickness, wherein a heatable platform shuttles between the press and the filling machine in a way such as to achieve an integrated filling machine/press assembly, wherein the mat is preheated by way of the heatable platform before the pressing in the press.

BACKGROUND OF THE INVENTION

Present processes are known for the manufacturing of both fine-thickness, i.e. fine and normal thickness particle board of fine and/or normal sized chips. A first known type of process relates to a continuous-flow production of particle board using calenders and the like, for example "Mendes" process. The second known type of process relates to a continuous production of particle board using a conveyer-belt, which moves first from under a filling machine, where the mat is made and then carries the mat under the press, where the final pressing operation occurs. This type of operation which is somewhat similar to the type of the present invention may be carried out in two different manners.

A first and better-known process essentially employs a movable filling machine and a fixed press. A conveyor-belt, either formed of a plastic-covered canvas and/or similar material, or formed of a steel-belt, moves between the filling machine and the fixed press and carries the mat from the former to the latter. To obtain the finished particle board, the mat is compressed while it lies on the belt at the press stage.

If a steel belt is used in this process, a number of difficulties are encountered due to the considerable expansion of the belt during the pressing operation. Furthermore, another disadvantage with the use of a metallic belt is the fact that it becomes impossible for the superheated vapor, generated within the pressed material, to be released satisfactorily.

On the other hand, if a fabric or similar belt is employed to eliminate these defects which are encountered with the use of a metallic belt, the produced particle board is often insufficiently flat, the thickness is inconsistent and the surface finish is not smooth and even. When this occurs, it is necessary to further finish the particle board, which results in increased manufacturing labor and costs. Also, this type of belt is considerably less durable than metallic belts, thereby entailing high maintenance costs.

A second process employs a belt system shuttling between the filling machine and the press, the belt depositing the mat directly on the press plate so as to obtain a good tolerance and surface finish quality of the final product and to eliminate subsequent surface finishing. Furthermore, this system obtains also a superior quality product. However, the system is extremely complicated and it contains the defects mentioned above and, futhermore, cannot be used to obtain fine thicknesses. In this case great difficulties are encountered in depositing the material in the plane of the press for producing thin products.

Processes with a movable filling machine and a movable press, while suggested, have not been in use in view of the difficulties in shifting these machines.

SUMMARY OF THE INVENTION

It is, accordingly, an object of the present invention to overcome the defects of the prior art, such as indicated above.

Another object is to provide a process for the improved production of finished boards from particulate material, and preferably for producing thin particle boards.

It is another object of the invention to provide an improved method for the manufacture of particle boards.

The invention with the above-stated objects, utilizing a fixed press and preheated materials, thus permits: shorter machine times, a simple system, and good quality products. Accordingly, the invention relates to the use of a combined filling machine/press, wherein the shuttle between the units constitutes a heatable platform which carries the mat from the filling machine to the pressing location. The heatable platform remains in the press during the pressing operation.

This method obviates all the above-mentioned defects and enables the production of finished particle board of a thickness, for example, down to 1 millimeter. As already mentioned above, the process of the present invention is suitably applied for producing particle board with fine chips, the greatest thickness being about 10 millimeters and preferably in the range of 4–6 millimeters. This does not, however, prevent production of finer or coarser particle board.

By using a heatable platform to shuttle between the press and the filling machine, the mat is naturally heated and molded on the same platform. When this platform moves under the filling machine, it is already hot from the preceding pressing operation and is thus also hot when, under the filling machine at the end of the line, it receives the material for pressing. Therefore, during the portion of the cycle when it moves under the press, the material has been preheated and its vapor released. This eliminates the aforementioned prior art problems, reduces pressing time, and improves the product. Any desired finishing may still be performed to obtain the required or desired surface. Obviously, therefore, the heatable platform must be made of a material which can retain sufficient heat during shuttling from the press to the filling machine to allow transfer of heat to the mat while the platform is being filled and then returned to the press.

In an important variation, a pair of such movable heatable platforms are provided to have one platform at its position in the press and the other one in the filling machine. Therefore, when pressing and filling are completed, these platforms interchange for a new operation. The interchange can be effected on two parallel guides or rails mounted above and a short distance away. It would, of course, be preferable during pressing for the lower pressing plate to rise, while the upper pressing plate remains fixed for pressing.

Finally, an important improvement is provided by suitable means to arrange for a substantial and in any event sufficient temperature difference between the two pressing plates directly or indirectly in contact with the particle board.

The heatable platform is the one that shuttles between the two machines. This can, of course, be interchanged with other heatable platforms of the same type which have the same function of supporting the mat while it is preheated. Such lower heatable platforms when called upon to support the mat to be pressed are not heated to a sufficiently high temperature so that the polymerization and/or curing of the resin with which the wood chips or the like are mixed, will occur. Rather the heat provided is sufficient to provide the appropriate heating or preheating without curing.

On the other hand, the upper pressing plate of the press is at a higher temperature such that the desired polymerization and/or curing is effected. Thus, when the preheated board is pressed with the aid of the lower pressing plate, heat will pass from the upper heating plate through the board to the lower heatable platform. This substantially improves the process since the pressing time and the quantity of vapor produced by the resin and the wood chips are reduced. Finally, boards formed of very fine chips can be produced since the supporting platform is the same one as is used in moving from the filling phase to the pressing phase.

Variants of the present invention and the apparatus used to carry out the process of the present invention may be provided as a press with several intermediate platforms shuttling between the press and one or more filling machines. These shuttling platforms are preferably built of rigid slabs of appropriate thickness which may contain heating means themselves, or which may be heated indirectly by elements which are part of the press. The invention does not exclude the use of heatable platforms in fine thicknesses instead of rigid slabs of the preferred greater thickness, and in this case the heatable platform will be flexible and will need support for the transfer between the two machines and for support within the machines. On the other hand, it is clear that when the lower heatable plates are thin, the preheating will be less than sufficient and in addition an auxiliary support will be needed, and thus this solution is less than appropriate.

In one preferable and simple device used according to the present invention, a filling machine and a press with a single pressing plate are provided, the press having a platform which serves as the heatable platform shuttling between the press and the filling machine. In an improved device, two of these types of platforms are provided for working in conjunction with one another.

In a second type of device, several filling machines are engaged with one press fitted with several pressing plates. In this case there will, of course, be several platforms shuttling between the press and the filling machines.

BRIEF DESCRIPTION OF THE DRAWING

The invention will be better illustrated with the aid of the attached drawing in which four machine assembly designs for use according to the invention are represented as examples. These assemblies permit particle board and/or other products to be obtained as explained above.

DETAILED DESCRIPTION OF THE EMBODIMENTS

The filling machines "B" in the embodiments illustrated are in all cases similar and of conventional construction, composed of an upper distributor 8 and two chip and resin bins 9 which are to receive and recycle the material falling outside the heatable platform 3 during the filling operation (see for example FIGS. 1, 5, 6 and 12–14). This does not, of course, prevent one from using any desired filling machine without thereby departing from the framework of the present invention.

Figure 1:
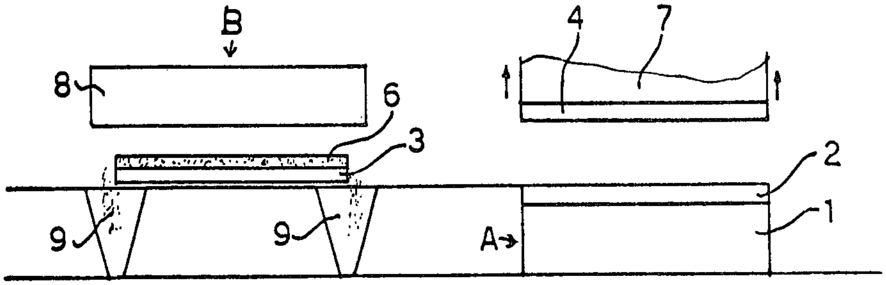
FIGS. 1, 2, 3 and 4 show schematic profile views, in four successive phases of the process, with a filling machine/press assembly in a first basic version, where a single press, a single filling machine, and a single platform shuttling between the two machines are provided.
Figure 2:
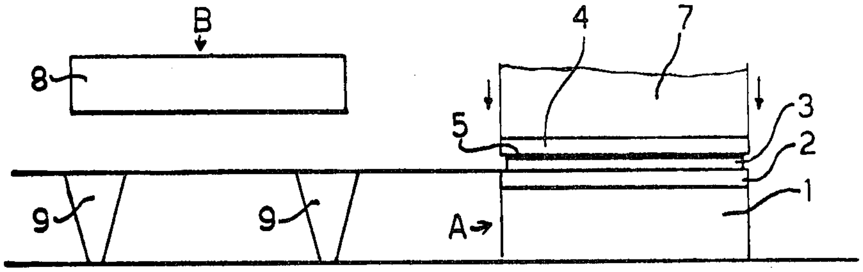
Figure 3:
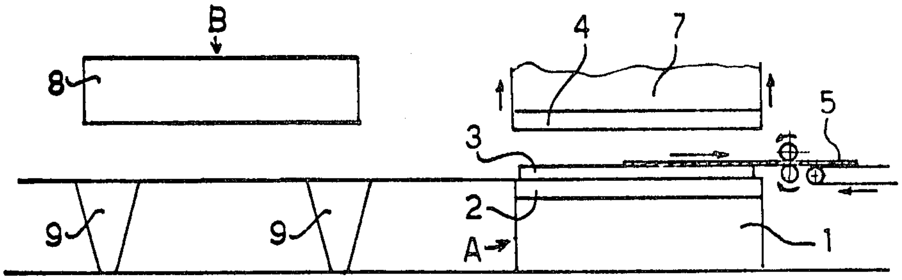
Figure 4:
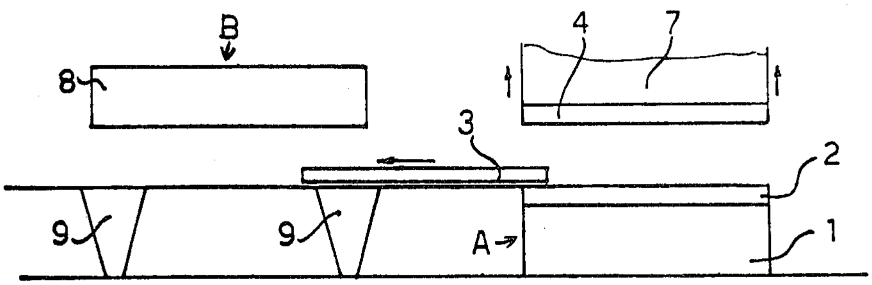
Figure 5:
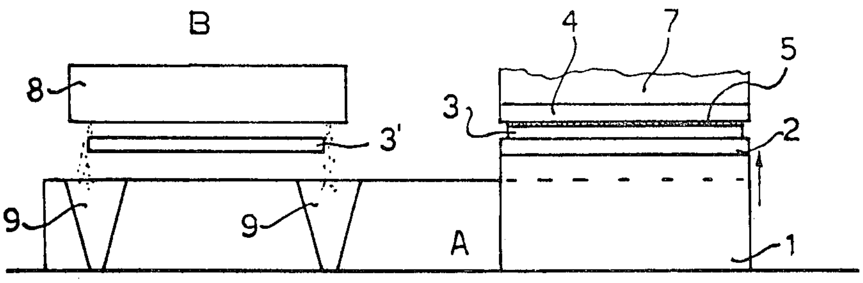
FIGS. 5, 6, 7 and 8 show schematic profile views in four successive phases of the process of a filling machine/press assembly in a second preferable basic version, still with a single press and a single filling machine but with two platforms shuttling between these two machines.
Figure 6:
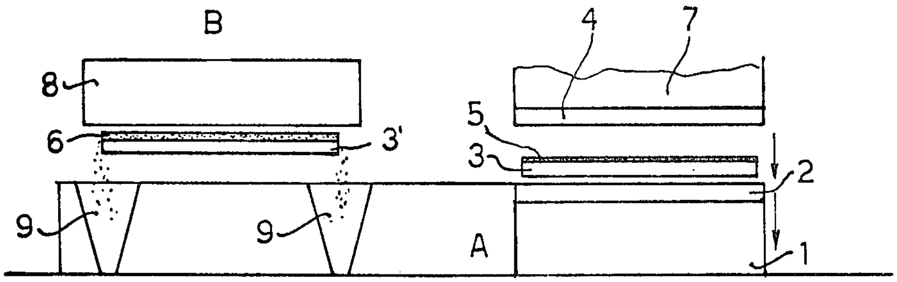
Figure 7:
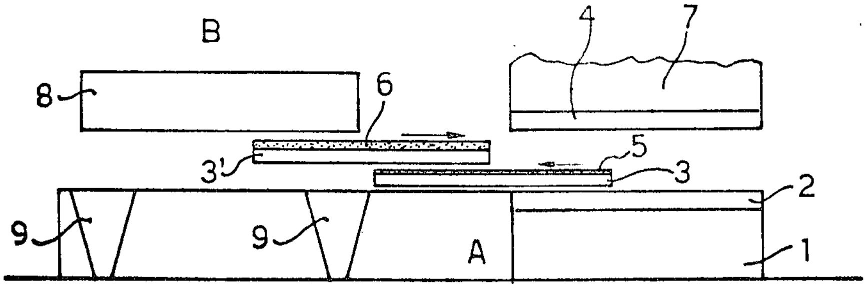
Figure 8:
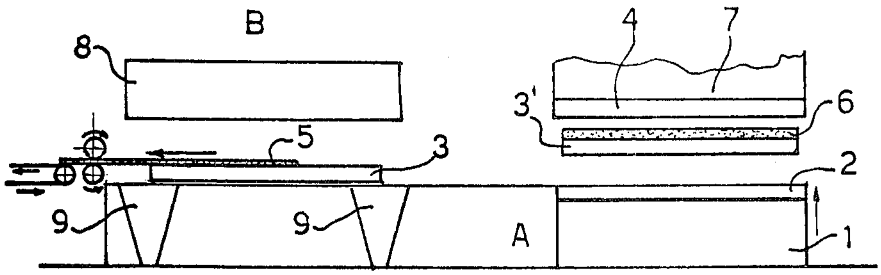
Figure 9:
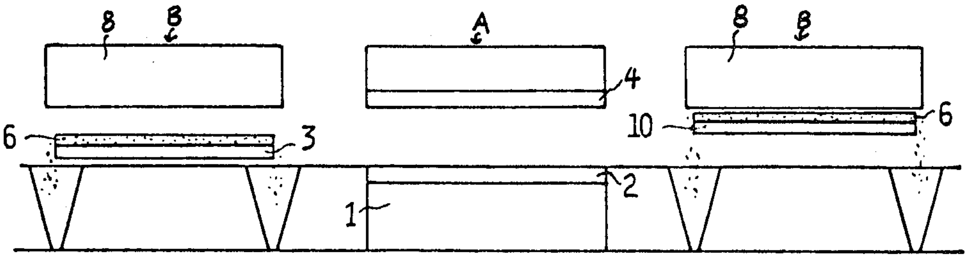
FIGS. 9, 10, 11 and 12 show schematic profile views, in four successive phases of the process of a filling machine/press assembly in a third version wherein a press with two pressing plates and two filling machines with only two platforms shuttling between the press and the two filling machines are provided.
Figure 10:
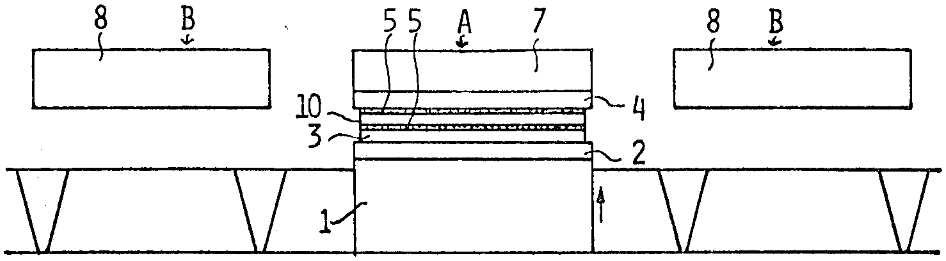
Figure 11:
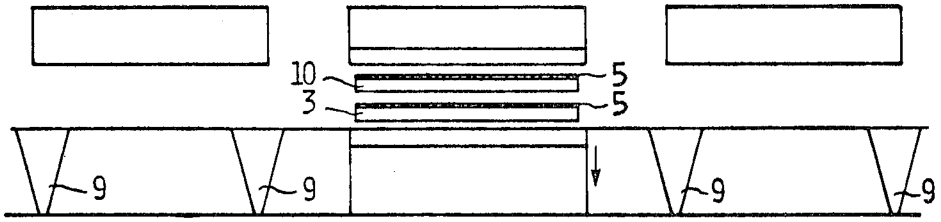
Figure 12:
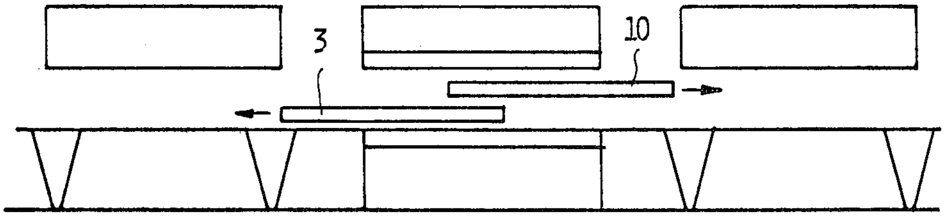

The figures, in depicting the press "A" illustrate only the basic characteristics, but this does not prevent such presses from being different outside of the essential characteristics. As shown in FIG. 2, the press "A" has a vertically reciprocable upper part 7 and a lower stationary part 1, which respectively carry the heated pressing plates 4 and 2 or the heatable platform 3.

In FIGS. 1–8 the press "A" is shown with one heatable platform 3 or 3', while in FIGS. 9–16 the press "A" is shown with two heatable platforms 3, 10 or 3', 10'. This does not prohibit providing the press with more than two heatable platforms, which fact would, of course, increase the filling capacity at the press.

Returning to FIG. 1–4 the embodiment illustrated therein is a less preferred construction of the press "A", since the upper pressing and heating plate 4 of the upper press part 7 is the reciprocating portion thereof. On the other hand, the better and preferred construction is shown in the embodiments of FIGS. 5–8, 9–12 and 13–15 in which the upper press part 7 and its pressing plate 4 are stationary, while the lower press part 1 and its pressing plate 2 are vertically reciprocable.

As shown in FIG. 2 during the pressing operation, as is conventional, the parts of the press are brought together to form a particle board 5. Noting FIG. 1, it will be understood that, as is also conventional, a mat 6 is deposited in the filling machine and this mat 6 will be transferred directly to the press for compression to form a particle board 5. In the prior art it is not known to use a heatable platform 3, as shown in FIGS. 1–4, which is part of the press and which shuttles between the filling machine "B" and the press "A" to first receive the mat 6 on its upper surface and then to transport this mat 6 to the press "A" where it is converted into the particle board 5.

FIGS. 1–4 have the following phases: filling, pressing, discharging the finished product, and shuttling the heatable platform 3 from the press to the filling machine "B", then recycling.

Referring to the embodiments of FIGS. 5–8 it can be seen, that filling and pressing is done at two different levels. Here the press "A" is provided with a first auxiliary heatable platform 3 and a second auxiliary heatable platform 3', both of which are shuttling directly between the filling machine and the press, the way it is illustrated.

The FIGS. 5–8 illustrate the following, respectively: simultaneous initiation of filling the heatable platform 3' in the filling machine "B" and pressing the heatable platform 3 in the press "A", (FIG. 5); completion of filling and pressing (FIG. 6); transfer of the heatable platform 3 with the finished particle board 5 from the press "A" to the filling machine "B" and transfer of heatable platform 3' with the filled-in mat 6 from the filling machine "B" to the press "A" (FIG. 7), and discharging the particle board 5 from the heatable platform 3 at the filling machine "B" and simultaneous initiation of the beginning of the pressing cycle of the mat 6 on the heatable platform 3' in the press "A" (FIG. 8), followed by recycling.

In the embodiment illustrated in FIGS. 9–12 it can be seen that two filling machines "B" are servicing a single press "A". The press, in turn, compresses two mats 6 at the same time, to form two particle boards 5 at the same time, one being carried by the heatable platform 3 and the other by the heatable platform 10.

The FIGS. 9–12, respectively, illustrate the following: filling (FIG. 9) pressing (FIG. 10), completion of pressing (FIG. 11) and discharge of the finished particle board 5 in the transverse direction (not illustrated), transfer of the heatable platforms 3 and 10 to the respective filling machines (FIG. 12), and recycling.

Figure 13:
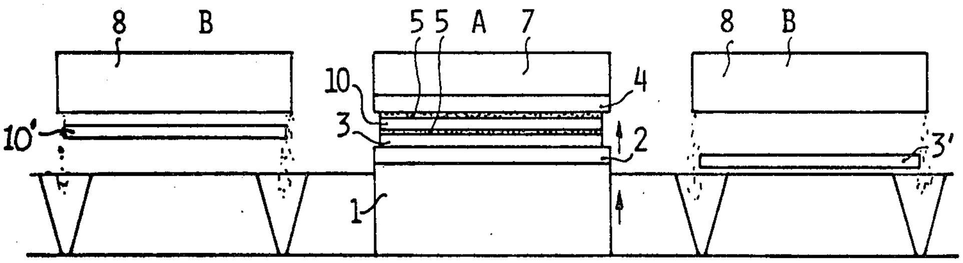
FIGS. 13, 14 and 15 show schematic profile views in three successive phases of the process of a filling machine/press assembly in a fourth version wherein a press with two pressing plates and two filling machines with four heatable platforms shuttling between the press and the two filling machines are provided.
Figure 14:
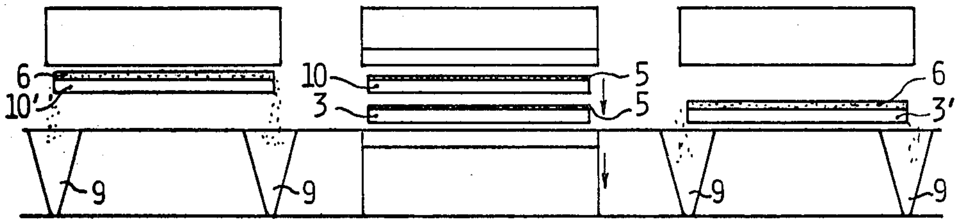
Figure 15:
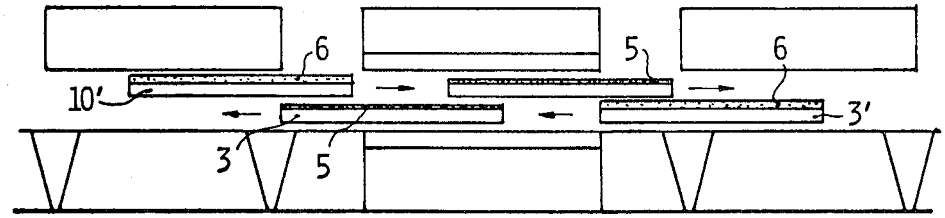

The embodiment shown in FIGS. 13–15, the most complex illustrated, is basically a combination of the embodiments shown in FIGS. 5–8 and FIGS. 9–12. Here are utilized four heatable platforms 3 and 10, 3' and 10', two on each of the pressing plates 2 and 4 and the press "A" forms two particle boards 5 during the same period of time which is necessary to form one particle board 5 with the embodiment shown in FIGS. 9–12.

The embodiment shown in FIGS. 13–15 illustrates the following: pressing with the press "A" and simultaneous filling with the filling machines "B" (FIG. 13), completion of pressing and filling (FIG. 14), and transfer of the heatable platforms 3 and 10 with the finished particle boards 5 from the press to the filling machines and simultaneous transfer of the heatable platforms 3' and 10' with the mats 6 to the press (FIG. 15). The finished particle boards 5 are discharged transversely (not shown).

As indicated above, the four heatable platforms 3, 3' and 10, 10' shuttling between the machines are preferably heated indirectly by the lower pressing plate 2 of the press "A". This does not prevent the heatable platforms 3, 3' and 10, 10' from being provided with their own heating elements, and in fact this latter provision is preferred in the more complex embodiments illustrated in FIGS. 9–12 and FIGS. 13–15.

A basic characteristic of the present invention is the fact that the upper pressing plate 4 has a greater quantity of heat and/or is heated to a higher temperature than the lower shuttling heatable platforms 3 and/or 3' and/or 10 and/or 10', whether the latter are provided with heating means or whether they are heated indirectly by the lower pressing plate 2 or by the upper pressing plate by heat transfer through the particle board.

The difference in the temperature of such pressing plates provides the ability to release heat to such an extent that the resin binder in the mat 6 is cured when such mat is pressed between the upper and the lower pressing plates 4, 2, while curing will not occur during the shuttling of the heatable platforms 3, 3', 10, 10' between the press and the filling machine. In this manner, damaging of the finished product is avoided. The heat provided by way of the shuttling heatable platforms 3, 3', 10, 10' gives only enough heat to the mat 6 to preheat it and this occurs during the shuttling operation. This way boards with very fine thickness can be pressed on these movable heatable platforms without causing any damage, since the product does not have to be shifted from one platform to another before and after the pressing operation.

It will be obvious to those skilled in the art that various changes may be made without departing from the scope of the invention, and the invention is not to be considered limited to what is illustrated in the drawing and described in the specification. For example, the sequence of steps indicated above may be changed in particular with regard to the time at which the finished board is discharged.

What is claimed is:

1. A method for producing particle board, having a thickness of from 1–10 mm, from particulate material, consisting primarily of wood chips, and heat-curable resin, using a filling machine, a press having an upper pressing plate and a lower pressing plate, wherein at least the upper pressing plate is heatable to a temperature above that of the curing of the resin, and a first heatable platform which moves back and forth directly between the upper pressing plate and the lower pressing plate, comprising the steps of:

(1) filling the first heatable platform in the filling machine with the particulate material and the resin to form a mat of wood chips mixed with the resin, the first heatable platform, during said filling step, having already been heated to a temperature above ambient temperature and below the temperature of curing of the resin;

(2) shuttling the first heated platform with the mat directly to the press between the upper pressing plate and the lower pressing plate;

(3) pressing the mat between said plates without removing the mat from the first heated platform and heating the mat to a temperature sufficient to effect the curing of the resin of the mat, in order to form the particle board and to reheat the first heated platform;

(4) opening the press;

(5) discharging the particle board from the heated platform; and (6) returning immediately the first heated platform directly to the filling machine, whereby during said steps (4) and (5) the first heated platform naturally reduces its temperature in a way that the reduced temperature is retained during said first and second steps above the ambient temperature but below the temperature of curing of the resin according to step (1) and the heated platform gives up the heat to the mat during said first and second steps.

2. A method in accordance with claim 1 further using a second heatable platform, which also moves back and forth directly between the filling machine and the press between the upper pressing plate and the lower pressing plate, further comprising the steps of:

(7) filling the second heatable platform in the filling machine with the particulate material and the resin to form a mat thereon, the second heatable platform during said filling steps, having already been heated to a temperature above ambient temperature and below the temperature of curing of the resin;

(8) shuttling the second heated platform with the mat thereon directly to the press between the upper pressing plate and the lower pressing plate;

(9) pressing the mat between said plates without removing the mat from the second heated platform and heating the mat to a temperature sufficient to effect curing of the resin of the mat to form the particle board and indirectly to reheat the second heated platform;

(10) opening the press;

(11) discharging the particle board from the second heated platform; and

(12) returning immediately the second heated platform directly to the filling machine, whereby during said steps (10) and (11) the second heated platform naturally reduces its temperature in a way that the reduced temperature is retained during said steps (7) and (8) above the ambient temperature but below the temperature of the curing of the resin according to step (7) and the heated platform gives up the heat to the mat during said steps (7) and (8).

wherein the first heated platform is in the press while at the same time the second heated platform is in the filling machine, and vice versa.

3. A method in accordance with claim 1 wherein only the upper pressing plate of the press is heated during said pressing step, the upper pressing plate being heated to a temperature above the curing temperature of the resin of the mat, said heatable platform being indirectly heated through the mat by the upper pressing plate to a temperature lower than that to which the upper pressing plate is heated.

4. A method in accordance with claim 1 wherein both the upper and lower pressing plates of the press are heated during said pressing step, the upper pressing plate being heated to a temperature higher than the temperature to which the lower pressing plate is heated to allow the resin of the mat to be cured and the heatable platform to be reheated.

* * * * *